Dec. 30, 1930. J. ROBBINS 1,786,455
STALK CUTTER
Filed March 30, 1928
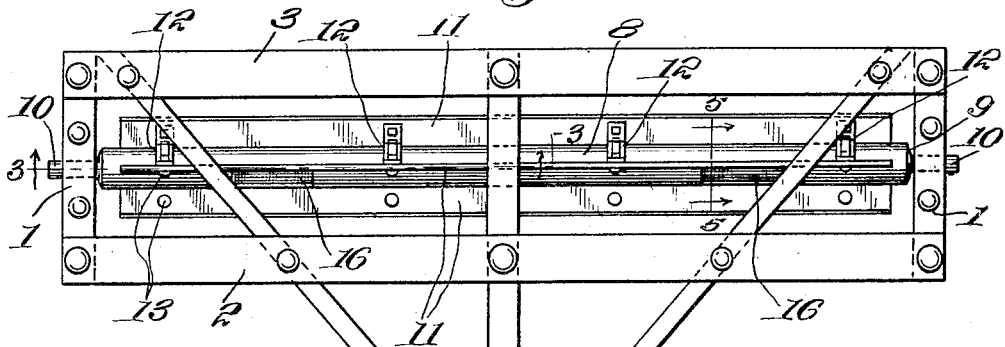
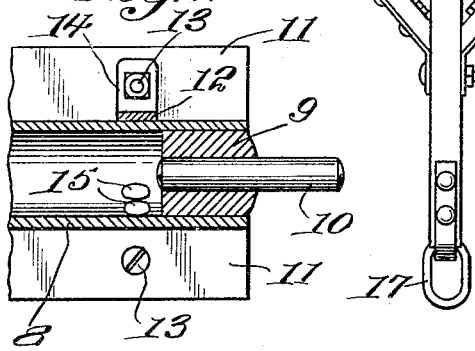
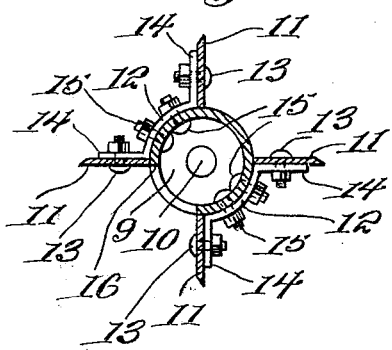
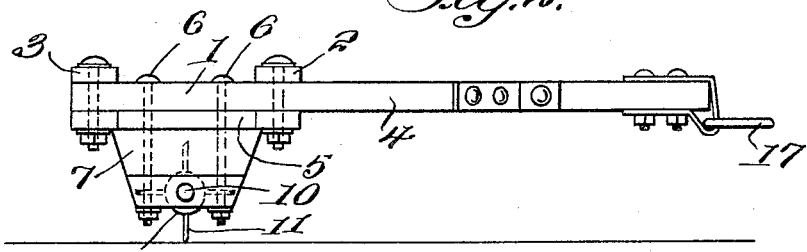
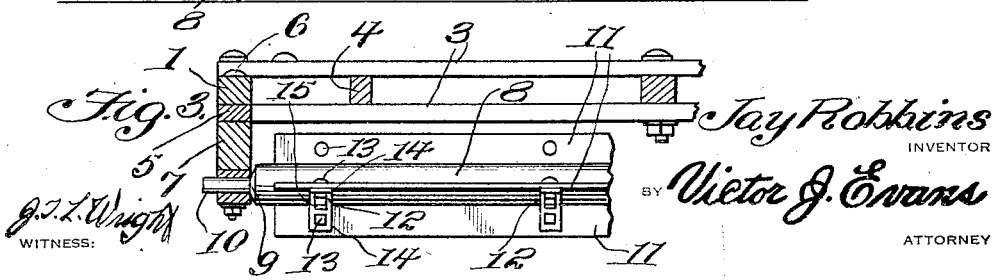
Jay Robbins
INVENTOR
BY Victor J. Evans
ATTORNEY
WITNESS:

Patented Dec. 30, 1930

1,786,455

UNITED STATES PATENT OFFICE

JAY ROBBINS, OF COOLEDGE, TEXAS

STALK CUTTER

Application filed March 30, 1928. Serial No. 265,942.

This invention relates to stalk cutters, and its general object is to provide a rotary stalk cutter including cutting blades secured in pairs longitudinally of the cylinder and arranged a considerable distance apart so as to be subjected to a chopping action for cutting stalks, weeds and the like accordingly with the result that such material will be thoroughly cut in a single operation.

A further object of the invention is to provide a cutter of the character set forth that is extremely simple in construction, inexpensive to manufacture and efficient in operation in service.

This invention also consists in certain other fatures of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a top plan view of the cutter forming the subject matter of the present invention.

Figure 2 is a side elevation thereof.

Figure 3 is a sectional view taken approximately on line 3—3 of Figure 1 looking in the direction of the arrows.

Figure 4 is a fragmentary sectional view taken through one end of the cylinder and showing one of the end shafts of the cutter together with its blades, in elevation.

Figure 5 is a sectional view taken on line 5—5 of Figure 1, looking in the direction of the arrows.

Referring to the drawings in detail, it will be noted that the chopper includes a body frame made up of side strips 1 with elongated front and rear strips 2 and 3 arranged in superposed pairs, as best shown in Figure 3 of the drawings. The front and rear strips are secured at their ends to the side strips 1 and a tongue extends centrally of the frame with its rear portion secured between the pairs of the front and rear strips. Converging braces 4 have their adjacent ends secured upon opposite sides of the tongue while their rear ends are secured between the rear strips.

Filler pieces 5 are disposed between the ends of the lowermost front and rear strips and underlie the side strips as best shown in Figure 2 and depending from these filler strips and secured thereto as well as the side strips 1 through the medium of bolt and nut connections 6 are depending side members 7 having their front and rear edges disposed at an inclination toward each other as clearly shown in Figure 2.

The cutter includes a hollow cylinder 8 having secured in its ends solid cores 9 which have secured therein and extending centrally therefrom stub axles 10 arranged for rotation in bearings formed in the side members 7.

Secured to the cylinder in equi-distantly spaced relation with respect to each other are cutting blades 11 which are arranged a considerable distance apart as best shown in Figure 5 of the drawings for a purpose which will be presently apparent. The cutting blades have their ends terminating adjacent the ends of the cylinder and are secured to the cylinder by brackets 12 which are formed in a manner whereby the blades are secured in pairs by bolt and nut connections 13, the blades being fixed to ears 14 by the bolt and nut connections 13 while the remaining portions of the brackets are secured to the cylinder by bolt and nut connections 15. The cyinder is provided with slots 16 arranged whereby access may be had to the nuts of the bolt and nut connections 15 when it is desired to secure or remove the blades from the cylinder as will be apparent.

The tongue is provided with a link or other like means 17 whereby propelling means can be secured to the cutter for drawing the same.

From the above description and disclosure of the drawings, it will be obvious that I have provided a cutter which will easily cut stalks, weeds and like material in a thorough manner due to the arrangement of the blades which are disposed a considerable distance apart on the cylinder with the result during the rotation of the cylinder the blades will be given a chopping action.

What I claim is:—

A cutter of the character described comprising a cylinder having cores disposed within the ends thereof, stub axles carried by and projecting from the cores, brackets secured upon the outer surface of the cylinder, ears projecting from the opposed side portions of the bracket members in right angularly disposed relation, and blades having fixed connection with the ears.

In testimony whereof I affix my signature.

JAY ROBBINS.